Aug. 8, 1967  T. WORSWICK  3,334,426
SHOE AND METHOD OF MANUFACTURING THE SAME
Filed March 4, 1963  3 Sheets-Sheet 1

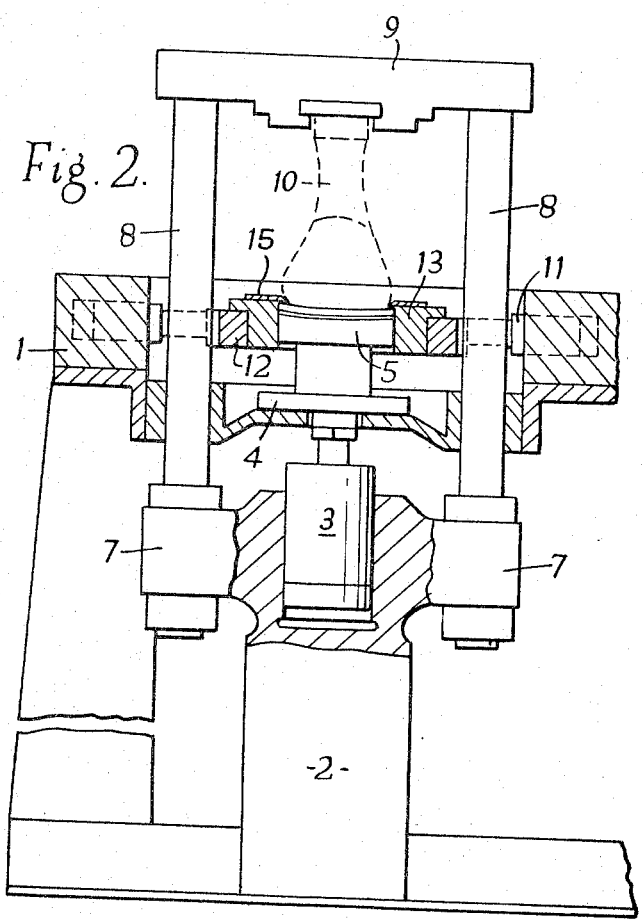

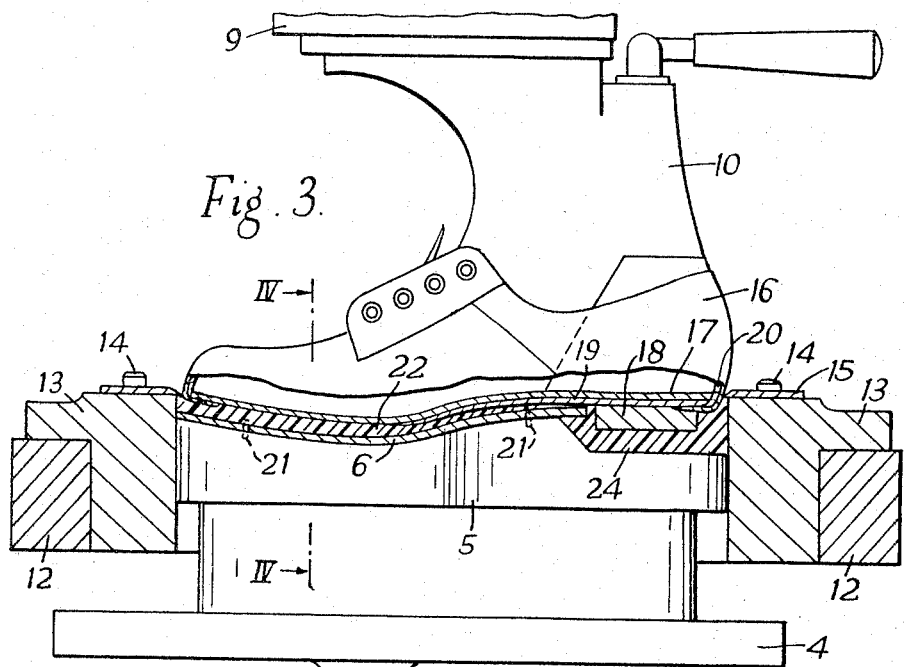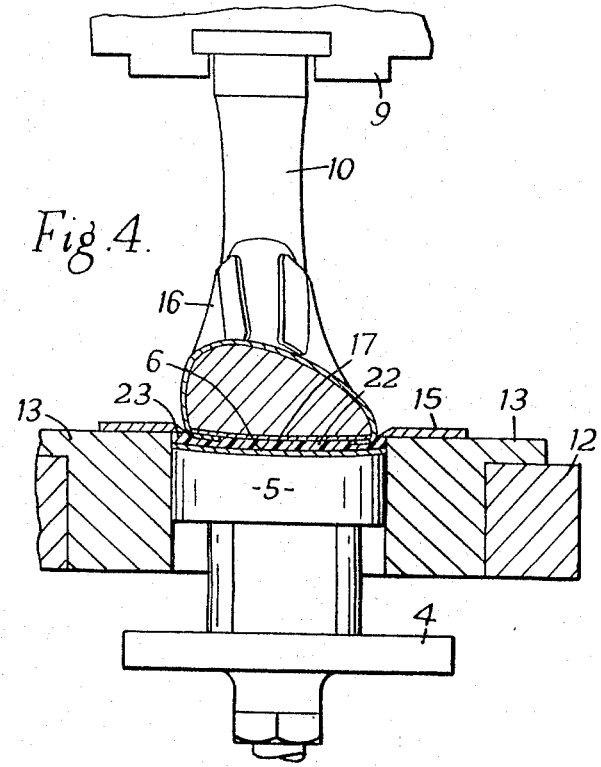

United States Patent Office 3,334,426
Patented Aug. 8, 1967

3,334,426
SHOE AND METHOD OF MANUFACTURING
THE SAME
Tom Worswick, Kirby Muxloe, England, assignor to
George Ward (Barwell) Limited, Barwell, Leicestershire, England, a British company
Filed Mar. 4, 1963, Ser. No. 262,678
Claims priority, application Great Britain, Mar. 28, 1962,
11,791/62
4 Claims. (Cl. 36—14)

This invention relates to the manufacture of shoes.

Most forms of shoe with a leather sole are at present connected to the upper by stitching, e.g. through an insole, and are equuiped with a welt, e.g. a Goodyear welt. The manufacture of Goodyear welted shoes demands time and often a good deal of skill.

An object of this present invention is a method of attaching a leather sole to an upper by means which provide the advantages, and the appearance, of a normally welted shoe, but which do not call for the same expenditure of production time and skill.

Another object is to produce a shoe with a completely waterproof bottom construction.

Plainly stated, then, in the method of shoe manufacture proposed by this invention a leather outersole is attached to an upper through the medium of an midsole which is moulded between them and simultaneously shaped to present a welt formation around part at least of the upper.

In practising the invention the welt formation can be arranged to extend round as much of the upper as is thought desirable, for example round the toe only.

As will be immediately apparent, the successful accomplishment of this technique means a great saving in machining time and labor costs in the production of a welted shoe. In practice it can also mean a very firm and permanent attachment of the sole to the upper and the exclusion of any danger of leakage in use whilst combining the visual appeal of a welted shoe and that of a leather sole. Furthermore such a sole is repairable by normal methods.

The basic method of this invention can be carried out in various ways. In the first place, the lasted upper may have an insole attached thereto prior to the formation of the midsole, this simplifying the problem of moulding the midsole and bonding it to the upper, as well as providing a built-in lining to the shoe bottom.

The midsole itself may be formed by various materials, for example of rubber or synthetic rubber or a suitable plastics material such as polyvinyl chloride. The moulding technique employed will, naturally, be determined or influenced by this material. However, in implementing the invention it has, in general, been found satisfactory to perform the moulding in a mould assembly comprising a last on which the upper is disposed, a sole mould plate which in the closed condition of the mould assembly is disposed opposite the sole of the last, and carries a blank of the leather outersole, and sidemold members which define the sides of the moulding chamber in the closed mould assembly and have parts to define a welt formation on the moulded midsole.

Thus, in the case of rubber, a conventional moulding and vulcanizing procedure is appropriate and in a preferred form the leather outsole blank is positioned on or against the inner face of the sole mould plate and a vulcanizing compound or mix of a rubber or rubber substitute is placed on this sole, whereafter the mould assembly is closed and heated to cause the compound or mix to flow, set to shape, and vulcanize.

As one alternative, the midsole may be similarly formed by low-pressure injection moulding of a plastics material or rubber (natural or synthetic) in the closed mould.

In most cases it is found satisfactory to bring the sidemold members to the last and then to close the partmould, thereby defined, by bringing in the sole mould plate as a final step, especially where this plate can be used to simultaneously load the mould with the moulding material. However, as an alternative the last may approach the closed-together sidemold members and sole mould plate to close the mould finally, and this may have the advantage of, in effect, allowing a greater exposure of upper material above the finished "welt."

It will be apparent that an appropriate choice of outersole is important, and we prefer to use a sole made from chrome tanned bend leather which can be retanned on the surfaces with vegetable tans so as to leave a definite chrome streak in the centre of the leather cross section, because this chromed leather is found to exhibit a heat resistance which allows it to be subjected to the vulcanizing temperature without damage and without impairing its ability to bond to the rubber or thermoplastics material. As is known to those skilled in the art, chrome leather is leather which has been fully tanned with basic chromium sulphate to give a minimum chromium oxide ($Cr_2O_3$) content of 3%. The term "bend" is known by those skilled in the art to define the prime portion of the cow hide, that is, at the rear portion of the back.

Moreover, it is preferred to use a leather of this character which has been pre-dried and pre-shrunk, e.g. at a temperature of 80° C. for approximately six hours, thereby to remove any entrapped moisture which might react to the applied heat so as to interfere with the moulding or vulcanization process and/or damage the leather.

Again, the leather may be pre-treated so as to assist the bonding action, e.g. by mechanical roughening, and then treatment with a bonding agent.

It will also be appreciated that the leather need not cover the complete bottom of the finished shoe. Thus the final sole could, for example, have a wear surface which is leather over most of the area but has one or more "inserts" of the rubber or thermoplastics material obtained by appropriately aperturing or recessing the leather sole blank before placing it in the mould. More than this, the heel portion of the sole could be made entirely of rubber or thermoplastics material during the formation of the midsole.

The invention also includes shoes made by the means described, for example having an outersole of leather united to the upper through the agency at least of a moulded midsole which covers the bottom of the upper, forms a sandwich between the latter and the outersole, and has a margin extending outwards around at least a part of the periphery of the lower portion of the upper and moulded to present the appearance of a welt.

Versions of the method according to this invention are illustrated in the accompanying drawings, in which:

FIGURE 2 is a vertical cross section on the line II—II of FIGURE 1 and is also in diagrammatic form.

FIGURE 3 is an enlarged side view of the moulding assembly used in performance of one embodiment of the present invention.

FIGURE 4 is a view of part of FIGURE 3, shown in cross section on the line IV—IV of the latter figure.

Figure 1:
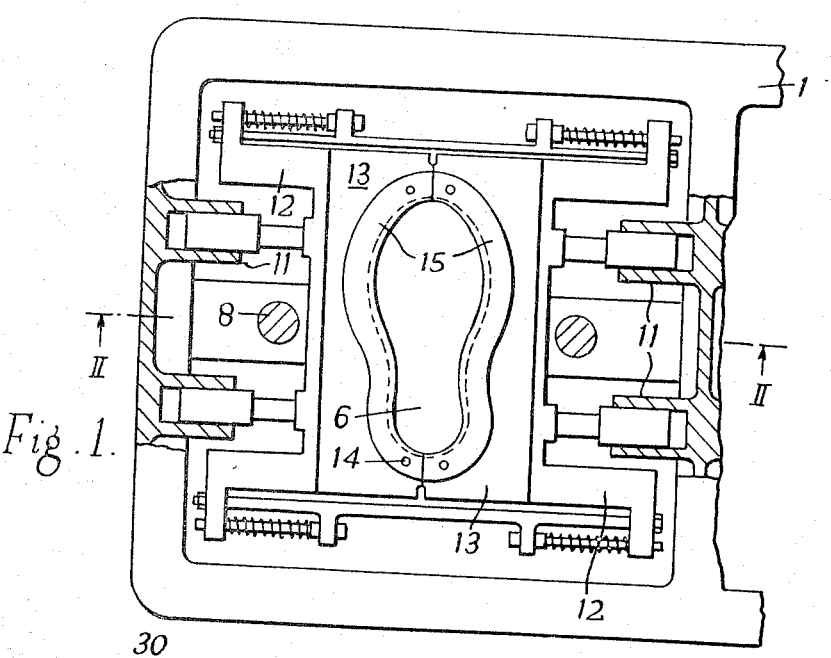
FIGURE 1 is a diagrammatic plan view of a known form of vulcanizing equipment which can be used in performance of the method of this invention.

As indicated above, the apparatus illustrated in FIGURES 1 and 2 is typical of known apparatus for forming moulded and vulcanized soles on footwear and, although it can be used in performance of this invention, to be hereinafter described, the apparatus per se forms no part of the present invention and therefore has not been illustrated in detail.

As shown it comprises a main frame 1, on the base of which is an upstanding post 2 with an upper central bore in which is slidable a hydraulic piston 3 supporting a platform 4, carrying a replaceable sole-mould plate 5. The upper face of this plate is contoured in accordance with the required shape and size of the wear face of the ultimate shoe sole, i.e. the toe, shank and heel portion.

The post 2 has lateral arms 7 supporting a pair of stay rods 8 which are connected at their upper ends to a cross head 9 serving to suspend a removable, internally-heatable steel last 10. The main frame 1 is also furnished at each side with a pair of spaced piston-cylinder units 11, and the pistons of each pair act on one of the two halves of a frame 12 carrying removable and internally-heatable sidemold members 13. The sidemold members are contoured so that, when closed together they define the boundary edge of the sole of the intended finished shoe, i.e. close up against the edge of the corresponding sole-mould plate 5. Thus parts 5 and 13 can be substituted as befits the particular size and shape of footwear bottom to be made in any particular operation. In addition the sidemold members 13 each carry a bevel-edged welt plate 15 which is secured by screw 14 and is adjustable to vary the amount it overhangs parent cheek 13.

In utilizing an apparatus of the form described, in performance of one embodiment of the present invention, now to be described by way of example, the lower face of each of the bevelled margins of plates 15 is of toothed or ridged form so as to serve as a surface for moulding the ultimate "welt" in the finished shoe.

A last 10, with a shoe upper 16 applied thereto in conventional fashion and roughened at the margin and treated with bonding agent, is mounted in the cross head 9. In the case particularly illustrated the upper, which may be of leather or other appropriate material and is provided with a heel counter 20, has an insole 17 fastened thereto to close the underside. It is assumed that only the toe and shank of the ultimate shoe bottom are to be leather covered and the heel of rubber, and a heel reinforcing core 18 is therefore secured to the insole 17, with the interposition of a steel shank 19 extending forwardly from the core 18 and conforming with the shank portion of the last.

An outer sole blank 6 of chrome bend leather, pre-shrunk and cut to size, i.e. to that of the toe and shank of the sole plate 5 and the foot of the last 10, is placed in position on the plate 5, being located there by pins 21 upstanding from the latter.

A blank of rubber vulcanization compound of pre-measured volume is placed on the outersole blank 6, and a further such blank for the eventual heel of the shoe is placed in the heel recess of the mould plate 5.

Next the sidemold members 13 are closed up to the last 10, and the upper disposed thereon, by operation of the hydraulic units 11, and the hydraulic unit 3 is operated to bring the sole mould plate 5 up into position to close the moulding chamber now defined between the foot of last 10 and the closed side cheeks 12. The various components of the mould structure being continuously heated, the rubber is heated and will flow under the applied pressure of the sole mould plate 5 to produce a flow of the rubber to fill the moulding chamber, bonding of the so formed midsole 22 to the upper 16, insole 17 and outersole 6. The rubber is then vulcanized for, say, 4 to 14 minutes. The outersole also has a marginal part 23 extending outwards around the toe, and this is embossed with a welt appearance by the plates 15. At the same time the moulding composition forms a vulcanized heel portion 24 of solid rubber, so that when, subsequently, the sole plate 5 is lowered, and the side cheeks 12 opened apart, it leaves a finished shoe on the last 10.

In carrying out this method, and similar procedures in accordance with this invention, it is of advantage to pre-heat the leather blank(s) and rubber compound before they are introduced into the mould. This represents a considerable saving of time in the mould and ensures the exclusion of moisture, and it can be performed in a hot air oven at the moulding site.

Indicative of the order of temperatures which have been found appropriate to the performance of a method according to this invention, using a chrome leather sole of about 3/16" thickness, we may mention the following.

The rubber vulcanizing compound or mix, which can be of a standard form as used for the manufacture of moulded rubber soles, will advantageously be pre-heated at about 70° C., whilst the leather sole will be pre-heated to the same temperature.

The mould parts will be at temperatures which can vary over a substantial range. The following is an indication of a convenient order of these temperatures:

|  | ° C. |
| --- | --- |
| Sole mould plate | 160 |
| Side cheeks | 160 |
| Metal last | 105 | but it will be understood that a sufficient degree of vulcanization can be attained when using an unheated metal last which will, in carrying out the process, reach a temperature of about 70° C. by conduction from the heated parts.

Figure 5:
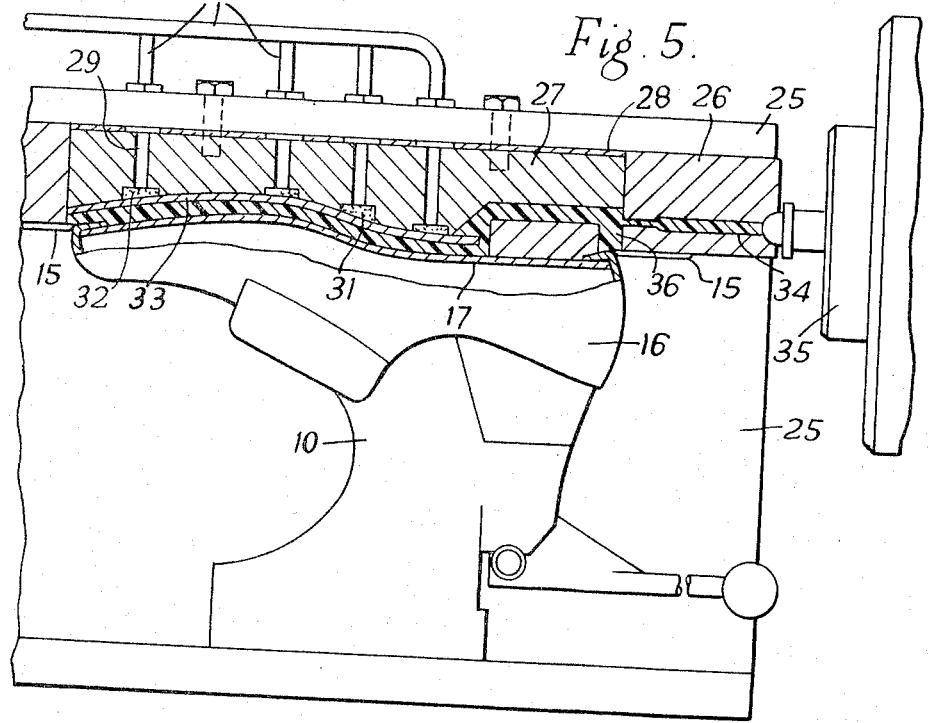
FIGURE 5 is a view similar to that of FIGURE 3 but illustrates the performance of a modified form of the method according to the present invention.

A second embodiment of this invention will now be described with reference to FIGURE 5 of the accompanying drawings, where the midsole is formed by low-pressure injection moulding a suitable plastic material, e.g. polyvinyl chloride, or a natural or synthetic rubber compound. In this case a last 10, which may be similar to that described in connection with the preceding embodiment, again forms part of the mould assembly which in this case also comprises a sole mould plate 27 and a frame constituted by a pair of side cheeks 26. The plate 27 is screwed to the cover of a mould box 25 and is therefore removable for replacement by plates of differently-sized and -shaped mould face. In this case again, the sidemold members have welt plates 15, corresponding to those in the previous embodiment, for ultimate moulding of a welt formation.

Extending through the plate 27 are a plurality of suction ducts 29 which are well distributed over the area of the mould interior and are all arranged to communicate, through corresponding apertures in a gasket 28, with connections 30 to a suction source. At its lower end each of the ducts 29 opens into a circular cavity 32, in the lower face of mould plate 27, housing a wad 31 of sintered or other porous material serving as a suction pad to retain the shoe sole in position. Thus, in a preliminary stage of the operation, the outersole 33, which again is preferably a pre-dried and pre-shrunk chrome leather bend of the required shape and size, is applied to the mould face of plate 27 (where it may be positioned by suitable pins), and when the suction is switched on, the outer sole 33 is drawn against the pads 32 and there held by suction.

The upper 16 is prepared in similar fashion to that described in connection with FIGURES 1 to 4, and the last bearing is brought into position beneath the mould cavity, for example being raised by suitable hydraulic means (not shown). It will be appreciated that, by applying the lasted upper to the mould cavity—standing ready—the depth of penetration of the upper into the cavity can be reduced, thus leaving the bend-under margin of upper material visible in the finished shoe to further enhance the "welt" appearance.

The mould cavity is filled with plastics material by injection moulding under low pressure from an injection nozzle 35 through a channel 34 in a side cheek. The midsole 36 so formed corresponds to the rubber midsole described in connection with the preceding figures of drawings.

I claim:

1. A method of shoe manufacture in which a leather outersole is attached to an upper through the medium of an midsole which is vulcanized and moulded between them and simultaneously shaped to present a welt formation around part at least of the upper.

2. A method of shoe manufacture according to claim 1, in which the outersole is composed of a blank of chrome leather and the leather blank is dried and pre-shrunk before the molding operation.

3. A method of shoe manufacture, in which an upper having a margin is lasted on a heat-conductive last, a leather outersole blank is mounted on a moulding component, a vulcanizing rubber compound is disposed on said outer sole blank, the last and moulding component are brought together to define a moulding space between the bottom of said upper and said blank, the moulding space being closed laterally by moulding side members shaped to define a wheeled welt on the finished article, and heat is applied to cause said vulcanizing compound to flow in said moulding space, to bond to said upper bottom and said outersole blank, and to set.

4. A shoe having an outersole of pre-shrunk, pre-dried leather united to the upper through at least a vulcanized moulded midsole which covers the bottom of the upper, forms a layer between the latter and the outersole, and has a margin extending outwards around at least a part of the periphery of the lower portion of the upper and moulded to present the appearance of a welt.

References Cited

UNITED STATES PATENTS

| | | | |
|---|---|---|---|
| 2,129,106 | 9/1938 | Szerenyi et al. | 12—142 X |
| 2,789,295 | 4/1957 | Rollman et al. | 12—142 |
| 2,799,034 | 7/1957 | Crowell et al. | 12—142 |
| 3,082,551 | 3/1963 | Hansjasten | 36—14 |
| 3,116,566 | 1/1964 | Ferreira | 36—30 |

PATRICK D. LAWSON, *Primary Examiner.*

FRANK J. COHEN, *Examiner.*